124,810

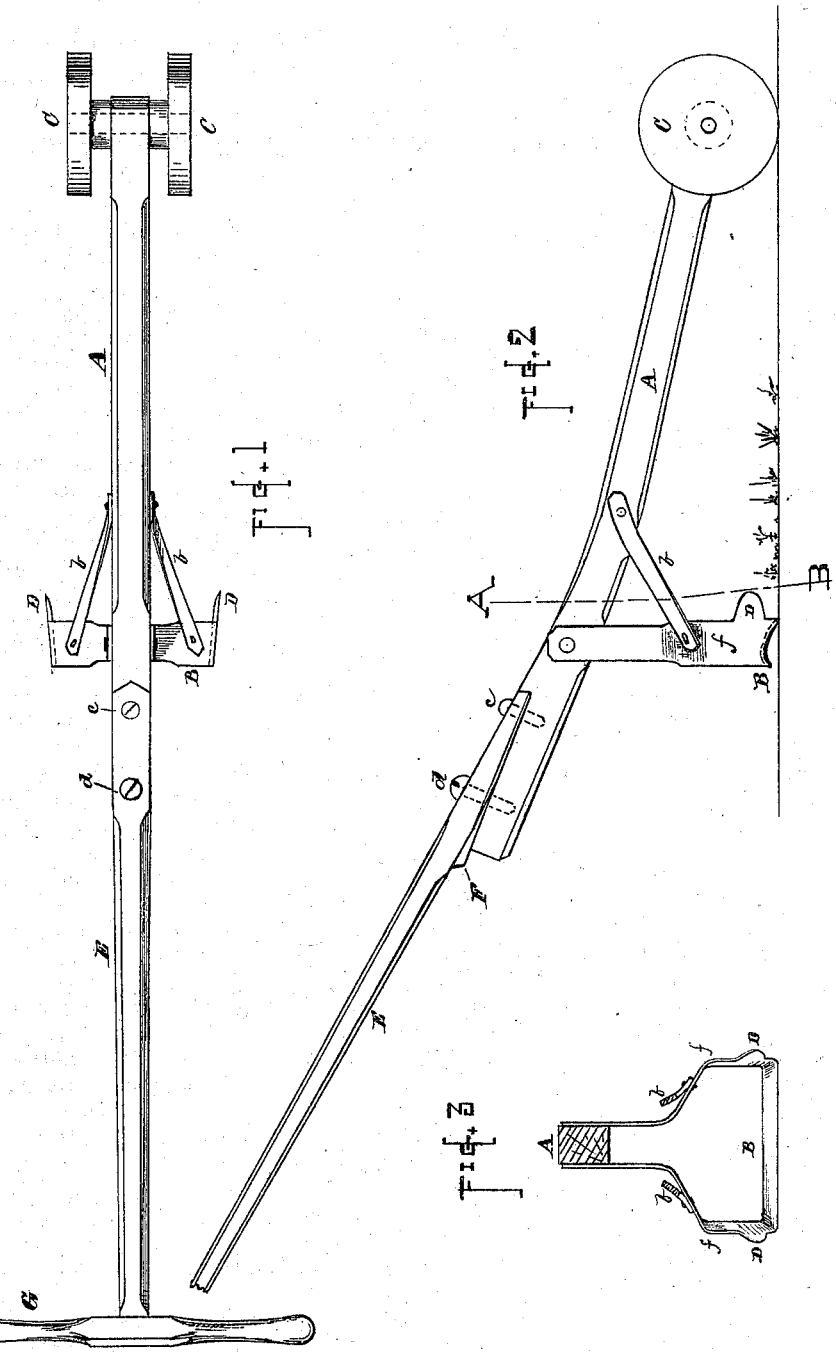

UNITED STATES PATENT OFFICE.

WILLIAM GOODWIN, OF MARBLEHEAD, ASSIGNOR TO FRANKLIN F. HOLBROOK AND THOMAS B. EVERETT, OF BOSTON, MASSACHUSETTS.

IMPROVEMENT IN HAND-HOE CULTIVATORS.

Specification forming part of Letters Patent No. 124,810, dated March 19, 1872.

*To all whom it may concern:*

Be it known that I, WILLIAM GOODWIN, of Marblehead, in the county of Essex and Commonwealth of Massachusetts, have invented certain new and useful Improvements in Hand-Wheel Hoes or Weeders; and I do hereby declare the following to be a full, clear, and exact description of the same, reference being had to the accompanying drawing which forms a part of this specification, in which—

Figure 1 represents a plan view of a hand-wheel hoe or weeder embracing my improvements. Fig. 2 represents a side view of the same; and Fig. 3 represents a transverse section of the implement at line A B, Fig. 2.

This invention relates to certain improvements in the construction of the handle and blades of a hand-wheel hoe or weeder, whereby a more convenient and effective implement is produced than has heretofore been in use.

In the drawing, the part marked A represents the beam or bar for supporting the weeding-blade B, which is secured to the bar A near its rear end in the manner illustrated, and is rendered stiff and rigid in its position by braces b b. C C indicate the traveling-wheels which support the forward end of the bar A, the wheels being arranged upon an arbor or spindle which passes through an opening in the end of the bar. The horizontal cutting-portion of the blade B is made in concavo-convex form, the central portion being arched upward in the manner indicated in Fig. 2, so that the front and rear edges come in contact with the ground, while the central portion is raised somewhat higher. The front edge of the blade is also arranged somewhat lower than the rear edge thereof, so that the latter will not strike the surface of the ground unless the hoe is tipped back for that purpose. By making the blade in concavo-convex or arched form, as described, the action of the soil upon the under surface of the blade tends to keep the blade sharp, thus obviating the necessity of grinding the edges of the blade. At the lower part of the upright side standards $f$ the metal is extended forward to form side guards or flukes D. These guards or flukes D are properly curved or rounded off at their lower edges, and are for the purpose of protecting the plants while working out the weeds in close proximity to their roots. The guards are spread a little toward the forward end of the hoe or weeder to facilitate the operation of running the implement close to the rows of plants or borders of the garden. These side guards or flukes may be used upon the blades of weeding implements of other construction than that herein shown and described, and I so propose to use them. By the use of the side guards or flukes D upon the sides of the cutting or weeding blades the implement can be run much nearer to the plants without injuring them than can be safely done with an implement using the ordinary cutters or blades, inasmuch as the guards divide the soil in a straight, smooth line without disturbing the soil that supports the small roots of the plants. This is a feature of great importance, and will be readily appreciated by those skilled in the use of weeding implements. The side standards $f$ and flukes D may, if desired, be cast of malleable iron or made of other suitable material, and the horizontal or cutting-portion of the blade be made of steel and secured to the standards $f$ by means of screws or rivets. The handle E is secured to the rear end of the bar A by means of two screws or bolts, $c\ d$, and an adjusting-wedge, F, is inserted between the bar and handle, whereby the rear end of the handle can be adjusted up or down to suit the convenience of the operator, whether tall or short in stature. The adjustment is made by loosening the screws $c\ d$ and inserting the wedge to a greater or less extent, after which the screws are again turned down to retain the parts in place. The forward end of the handle E may be made square; or it may, as in the present instance, be made angular and fitted to a V-shaped notch or recess upon the bar A, whereby the parts are retained more securely in connection, and the joint rendered more rigid and durable, and less lateral strain brought upon the screws $c\ d$. The rear end of the handle is provided with a cross-head or hand-bar G turned off at the ends, so as to be conveniently grasped.

It will be observed that the handle E can be detached from the other portion of the hoe by removing the screws $c\ d$, and the whole conveniently and closely packed for shipment.

Having described my improved hand-wheel hoe or weeder, what I claim therein as new and of my invention, and desire to secure by Letters Patent, is—

1. The combination, with the bottom cutting-blade of a hoe or weeder, of forwardly-projecting cutting-flukes or side cutting-guards D D, substantially as shown and described.

2. The combination, with the cutting and wheel devices in a hand-wheel hoe, of an adjustable handle, for the purposes stated.

3. The combination, with the bar A which supports the cutting-blade B, of the adjustable handle E and adjusting-wedge F, substantially as and for the purposes set forth.

WILLIAM GOODWIN.

Witnesses:
JOHN W. RODGERS,
WILLIAM W. ORNE.